United States Patent
Kishi et al.

(10) Patent No.: US 10,629,952 B2
(45) Date of Patent: Apr. 21, 2020

(54) NONAQUEOUS ELECTROLYTE BATTERY, BATTERY PACK, AND VEHICLE

(71) Applicant: Kabushiki Kaisha Toshiba, Minato-ku (JP)

(72) Inventors: Takashi Kishi, Yokosuka (JP); Takuya Iwasaki, Uenohara (JP); Hiroki Iwanaga, Yokohama (JP); Jun Tamura, Tokyo (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 192 days.

(21) Appl. No.: 15/262,345

(22) Filed: Sep. 12, 2016

(65) Prior Publication Data

US 2017/0077551 A1 Mar. 16, 2017

(30) Foreign Application Priority Data

Sep. 16, 2015 (JP) ................................. 2015-182795

(51) Int. Cl.
*H01M 10/056* (2010.01)
*H01M 10/0567* (2010.01)
(Continued)

(52) U.S. Cl.
CPC ....... *H01M 10/0567* (2013.01); *B60L 3/0046* (2013.01); *B60L 3/04* (2013.01);
(Continued)

(58) Field of Classification Search
CPC ...... H01M 2/1077; H01M 2/30; H01M 2/348; H01M 4/131; H01M 4/485; H01M 10/0567; H01M 10/0525
(Continued)

(56) References Cited

U.S. PATENT DOCUMENTS

| 8,574,773 B2 * | 11/2013 | Wilson | H01M 6/168 429/200 |
| 2006/0180796 A1 * | 8/2006 | Adachi | C09K 5/20 252/500 |

(Continued)

FOREIGN PATENT DOCUMENTS

| JP | 2004-134261 A | 4/2004 |
| JP | 2004-134261 A5 | 4/2004 |

(Continued)

OTHER PUBLICATIONS

Chunye Xu, et al., "Electrolyte for Laminated Polymer Lithium Rechargeable Battery" Electroactive Polymer Actuators and Devices (EAPAD), vol. 6927, 2008, pp. 692714-1-692714-9.

*Primary Examiner* — Amanda C. Walke
(74) *Attorney, Agent, or Firm* — Oblon, McClelland, Maier & Neustadt, L.L.P.

(57) ABSTRACT

According to one embodiment, a nonaqueous electrolyte battery includes a positive electrode, a negative electrode and a nonaqueous electrolyte. The negative electrode includes a titanium and niobium-containing composite oxide. The nonaqueous electrolyte includes at least one compound selected from compounds represented by the formulas (1) and (2).

formula (1)

(Continued)

-continued

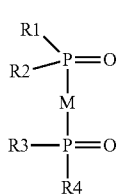
formula (2)

17 Claims, 4 Drawing Sheets

(51) Int. Cl.
*H01M 2/10* (2006.01)
*H01M 4/485* (2010.01)
*B60L 3/04* (2006.01)
*B60L 3/00* (2019.01)
*B60L 50/64* (2019.01)
*H01M 10/0525* (2010.01)
*H01M 4/62* (2006.01)
*H01M 10/42* (2006.01)
*H01M 10/04* (2006.01)
*H01M 10/0569* (2010.01)

(52) U.S. Cl.
CPC ........... B60L 50/64 (2019.02); H01M 2/1077 (2013.01); H01M 4/485 (2013.01); *B60L 2240/545* (2013.01); *H01M 4/625* (2013.01); *H01M 10/0468* (2013.01); *H01M 10/0525* (2013.01); *H01M 10/0569* (2013.01); *H01M 10/425* (2013.01); *H01M 2200/10* (2013.01); *H01M 2220/20* (2013.01); *H01M 2300/0037* (2013.01); *Y02E 60/122* (2013.01); *Y02T 10/705* (2013.01); *Y02T 10/7005* (2013.01)

(58) Field of Classification Search
USPC ........................................................ 429/221
See application file for complete search history.

(56) References Cited

U.S. PATENT DOCUMENTS

| | | | |
|---|---|---|---|
| 2009/0325065 A1* | 12/2009 | Fujii | H01M 4/04 429/199ke |
| 2010/0119956 A1* | 5/2010 | Tokuda | H01M 4/134 429/338 |
| 2011/0151336 A1 | 6/2011 | Lee et al. | |
| 2012/0107692 A1 | 5/2012 | Harada et al. | |
| 2012/0171550 A1 | 7/2012 | Inagaki et al. | |
| 2013/0078530 A1 | 3/2013 | Kishi et al. | |
| 2013/0209863 A1* | 8/2013 | Harada | H01M 4/483 429/163 |
| 2013/0280622 A1 | 10/2013 | Tokuda et al. | |
| 2014/0120380 A1* | 5/2014 | Inagaki | C01G 33/00 429/7 |
| 2014/0252267 A1 | 9/2014 | Yan et al. | |
| 2014/0295289 A1 | 10/2014 | Takami et al. | |
| 2015/0108399 A1* | 4/2015 | Inagaki | C01G 23/005 252/182.1 |
| 2015/0140444 A1* | 5/2015 | Dubois | H01M 4/505 429/331 |
| 2015/0188192 A1 | 7/2015 | Fujii et al. | |
| 2015/0372349 A1* | 12/2015 | Shikita | H01G 11/64 429/326 |
| 2016/0276691 A1* | 9/2016 | Williams | H01M 8/188 |
| 2016/0359197 A1* | 12/2016 | Watarai | H01M 10/0567 |
| 2017/0275311 A1* | 9/2017 | Kotou | H01G 11/06 |
| 2018/0083283 A1* | 3/2018 | Yamashita | H01M 4/0404 |

FOREIGN PATENT DOCUMENTS

| | | |
|---|---|---|
| JP | 2007-299541 A | 11/2007 |
| JP | 2007-299541 A5 | 11/2007 |
| JP | 2007-299542 A | 11/2007 |
| JP | 2007-299542 A5 | 11/2007 |
| JP | 2007-299543 A | 11/2007 |
| JP | 2007-299543 A5 | 11/2007 |
| JP | 2008-277002 A | 11/2008 |
| JP | 2011-187440 A | 9/2011 |
| JP | 2011-187440 A5 | 9/2011 |
| JP | 2012-99287 A | 5/2012 |
| JP | 2013-69638 A | 4/2013 |
| JP | 2014-6971 A | 1/2014 |
| JP | 2014-192154 | 10/2014 |
| JP | 2014-209436 A | 11/2014 |
| JP | 2015-111557 | 6/2015 |
| JP | 2017-59386 A | 3/2017 |
| WO | WO 2007/126068 A1 | 11/2007 |
| WO | WO 2011/010371 A1 | 1/2011 |
| WO | WO 2015/136688 A1 | 9/2015 |

* cited by examiner

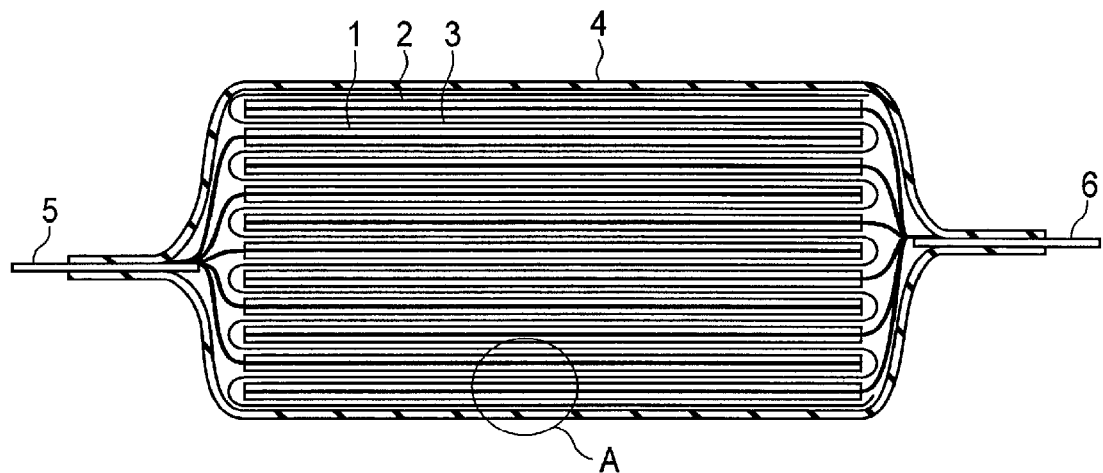
F I G. 1
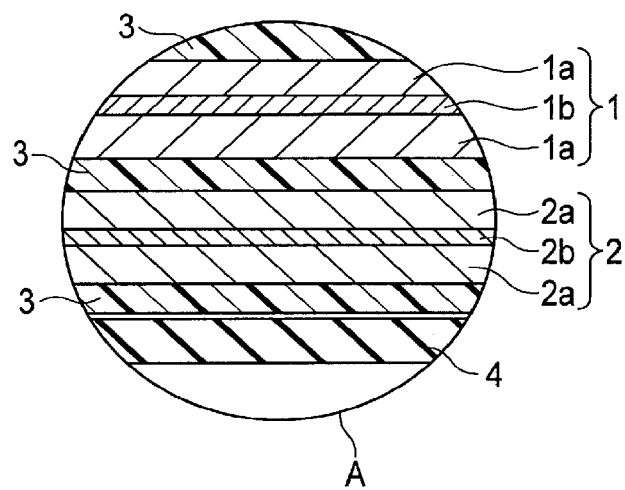
F I G. 2

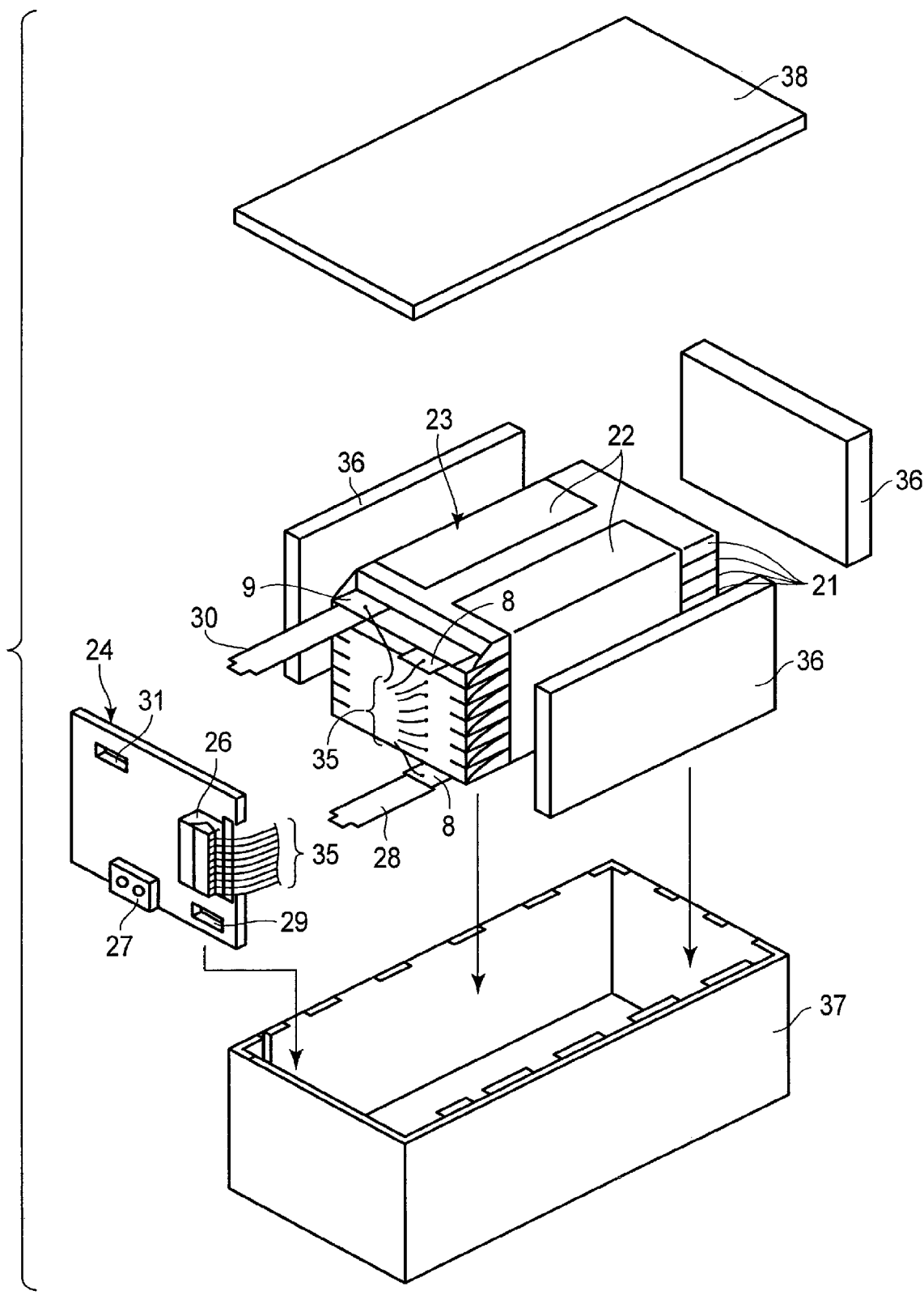
F I G. 5

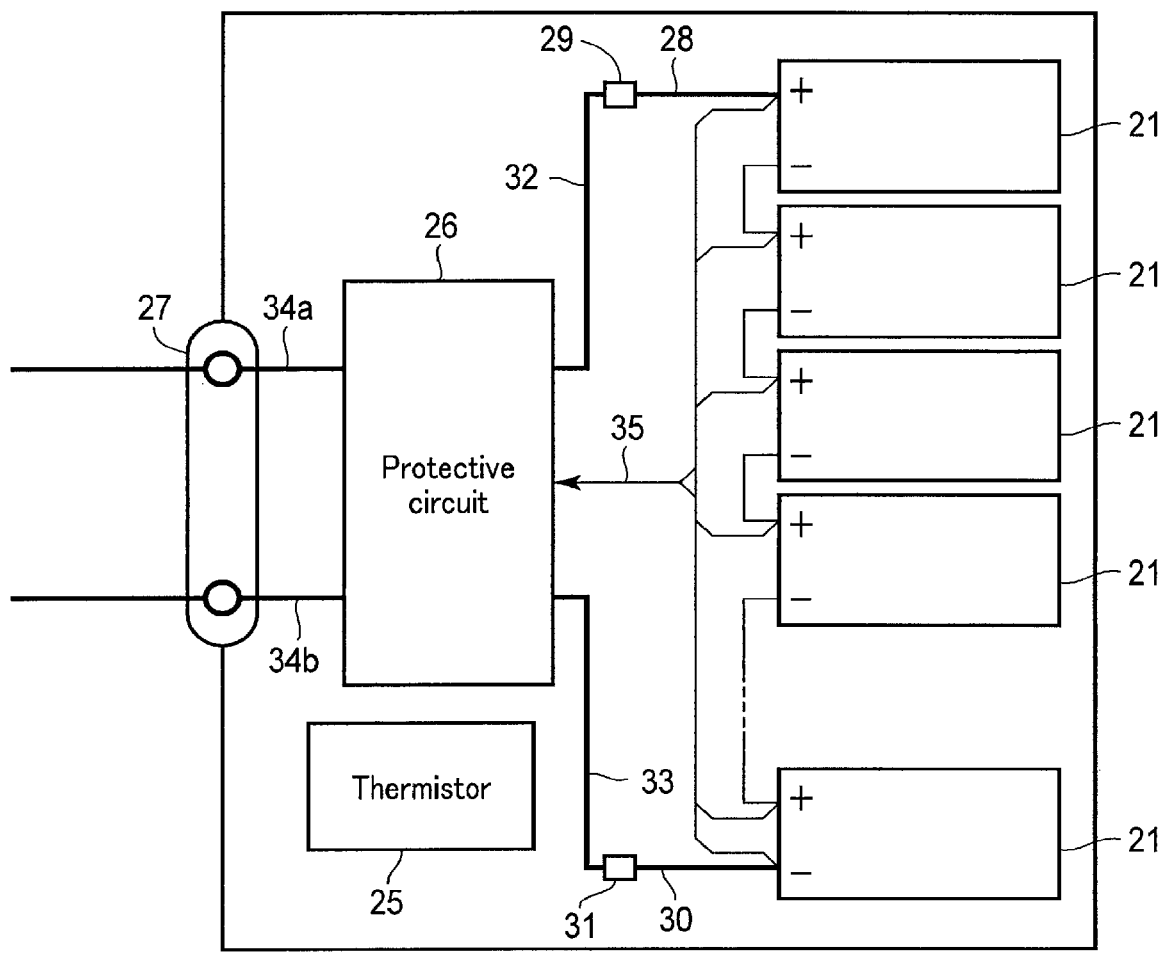
F I G. 6
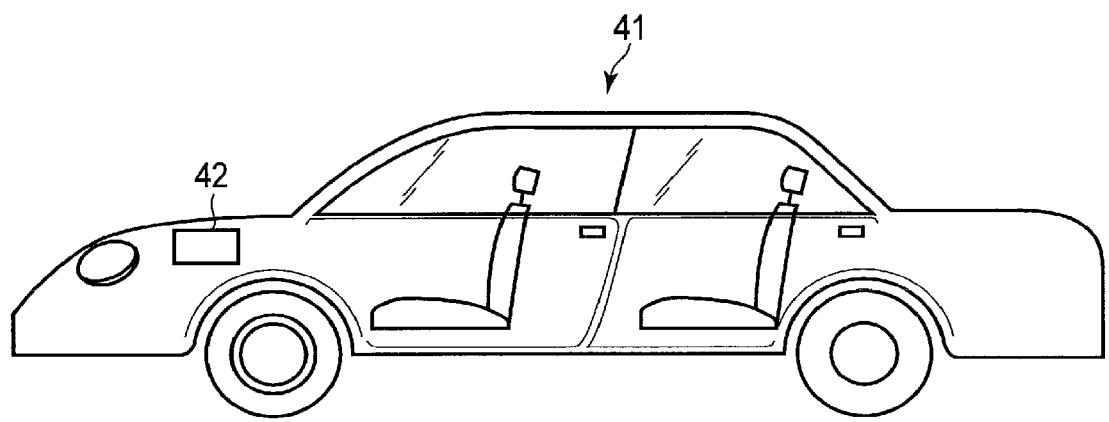
F I G. 7

NONAQUEOUS ELECTROLYTE BATTERY, BATTERY PACK, AND VEHICLE

CROSS-REFERENCE TO RELATED APPLICATIONS

This application is based upon and claims the benefit of priority from Japanese Patent Application No. 2015-182795, filed Sep. 16, 2015, the entire contents of which are incorporated herein by reference.

FIELD

Embodiments of the present invention relate to a nonaqueous electrolyte battery, a battery pack and a vehicle.

BACKGROUND

Secondary batteries can be used under repeated charge and discharge. Therefore, secondary batteries are useful for reducing waste products, and widely used as power sources for portable devices that cannot use an alternating-current (AC) power source, and power sources for backup in case of disconnection or stoppage of AC power sources. In recent years, an expansion in the range of applications has been considered, such as an in-vehicle application, backup for solar cells and the like, and power leveling application, and there are accordingly increasing demands for improvements in performance such as capacity, temperature characteristics, and safety.

Among secondary batteries, the term nonaqueous electrolyte secondary batteries refers to secondary batteries that are charged and discharged by the movement of lithium ions between positive and negative electrodes. In addition, nonaqueous electrolyte secondary batteries include electrolytic solutions including an organic solvent, and thus have a feature of being able to achieve higher voltages than nickel-cadmium secondary batteries and nickel-metal-hydride secondary batteries that use aqueous solutions. Currently, lithium-containing cobalt composite oxides and lithium-containing nickel composite oxides are used as positive electrode active materials for nonaqueous electrolyte secondary batteries in practical use. Carbon-based materials and titanium-containing oxides are used as negative electrode active materials. In addition, lithium salts such as $LiPF_6$ or $LiBF_4$ dissolved in organic solvents such as cyclic carbonate and chain carbonate are used as electrolytic solutions. The positive electrode active materials have, with respect to the lithium metal potential, an average operation potential on the order of 3.4 to 3.8 V (vs. $Li/Li^+$) and a maximum possible potential of 4.1 to 4.3 V (vs. $Li/Li^+$) in the case of charge. On the other hand, the carbon-based materials as negative electrode active materials achieve a potential on the order of 0.05 to 0.5 V (vs. $Li/Li^+$) with respect to the lithium metal potential, whereas the most typical lithium titanate ($Li_4Ti_5O_{12}$) achieves is 1.55 V (vs. $Li/Li^+$) among the titanium-containing composite oxides. The combinations of the positive and negative electrode active materials achieve battery voltages of 2.2 V to 3.8 V and a maximum charge voltage of 2.7 V to 4.3 V.

Secondary batteries that include titanium-containing oxides for negative electrodes can increase the charge-and-discharge cycle life, and such batteries have been put into practical use. However, while conventional lifespans of 2 to 3 years have been requested for mobile device applications, that for in-vehicle applications and stationary applications related to power generation is requested to be 10 years or more. Correspondingly, a further improvement in such secondary batteries is required. The most representative cycle performance of life performance is expressed as a decrease in battery capacity in the case of repeating charge and discharge, and the 2 to 3 years for mobile device applications corresponds to hundreds of times, whereas the 10 years or longer for in-vehicle and stationary applications corresponds to several or ten thousand times or more.

The main cause of cycle deterioration has not been clarified for batteries that include titanium-containing oxides as the negative electrode active material.

BRIEF DESCRIPTION OF DRAWINGS

FIG. 1 is a cross-sectional view that is obtained by cutting, in a terminal extending direction, an example of a nonaqueous electrolyte secondary battery according to an embodiment;

FIG. 2 is an enlarged cross-sectional view of an A part in FIG. 1;

FIG. 5 is an exploded perspective view of a battery pack according to an embodiment;

FIG. 6 is a block diagram illustrating an electrical circuit of the battery pack in FIG. 5; and FIG. 7 is a schematic diagram illustrating an example of a vehicle with a nonaqueous electrolyte secondary battery according to an embodiment therein.

DETAILED DESCRIPTION

Figure 3:
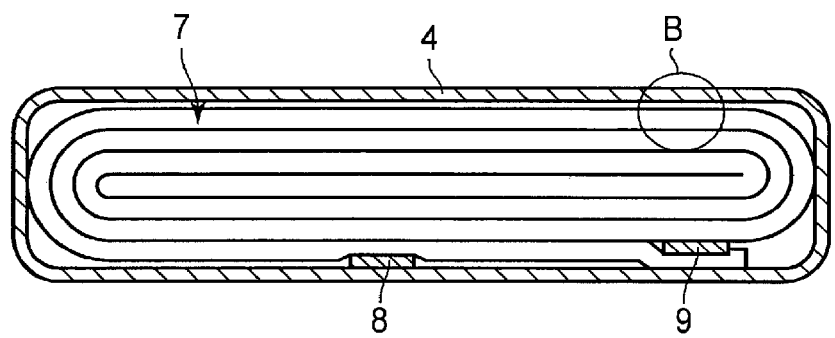
FIG. 3 is a cross-sectional view that is obtained by cutting another example of the nonaqueous electrolyte secondary battery according to the embodiment.

According to one embodiment, a nonaqueous electrolyte battery includes a positive electrode, a negative electrode and a nonaqueous electrolyte. The negative electrode includes a titanium and niobium-containing composite oxide. The nonaqueous electrolyte includes at least one compound selected from compounds represented by the following formulas (1) and (2)

formula (1)

wherein $R_1$, $R_2$, and $R_3$ may be identical to or different from each other, and are each an alkyl group, an alkyl group having, as a part of a structure, an unsaturated bond, an ether bond, amine, or halogen, an aromatic group, an alkoxy group, halogen, or a hydroxy group and

formula (2)

wherein $R_1$, $R_2$, $R_3$, and $R_4$ may be identical to or different from each other, and are each an alkyl group, an alkyl group having, as a part of a structure, an unsaturated bond, an ether bond, amine, or halogen, an aromatic group, an alkoxy group, halogen, or a hydroxy group, and M is an alkyl chain, an aromatic site, or an ether bond.

According to another embodiment, a battery pack includes the nonaqueous electrolyte battery according to the embodiment.

According to another embodiment, a vehicle includes the battery pack according to the embodiment.

First Embodiment

According to a first embodiment, a nonaqueous electrolyte battery includes a positive electrode, a negative electrode, and a nonaqueous electrolyte. The negative electrode contains a titanium and niobium containing composite oxide. The nonaqueous electrolyte contains at least one compound (hereinafter, referred to as a phosphate compound) selected from the compounds represented by the formula (1) and the formula (2).

formula (1)

$R_1$, $R_2$, and $R_3$ may be identical to or different from each other, and are each an alkyl group, an alkyl group having, as a part of the structure, an unsaturated bond, an ether bond, amine, or halogen, an aromatic group, an alkoxy group, halogen, or a hydroxy group. The carbon number of the alkyl group can fall within the range of 1 to 8.

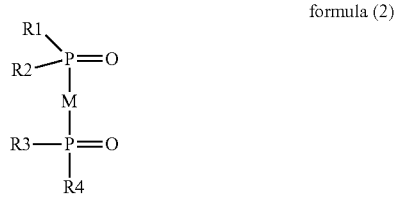

formula (2)

$R_1$, $R_2$, $R_3$, and $R_4$ may be identical to or different from each other, and are each an alkyl group, an alkyl group having, as a part of the structure, an unsaturated bond, an ether bond, amine, or halogen, an aromatic group, an alkoxy group, halogen, or a hydroxy group, and M is an alkyl chain, an aromatic site, or an ether bond. The carbon number of the alkyl group can fall within the range of 1 to 8.

In the formula (1) and the formula (2), the alkyl group having, as the part of the structure, the unsaturated bond, the ether bond, amine, or halogen is an alkyl group whose C—H bond, C—C bond, C or H is substituted by the unsaturated bond, the ether bond, amine, or halogen.

The nonaqueous electrolyte battery according to the embodiment effectively inhibits a side reaction in a charge-discharge reaction, thereby making it possible to improve the cycle performance. Although the reason has not been clarified, the following explanation is presumed to be a factor.

It is presumed to be because a battery that includes a titanium-containing oxide for a negative electrode active material is superior in cycle performance to a battery that includes a carbon-based material for a negative electrode active material. The battery that includes the titanium-containing oxide for a negative electrode active material is believed to suppress cycle degradation, because the negative electrode operates at a higher potential (nobler potential) than a battery that includes a carbon-based material for a negative electrode active material, thereby effectively preventing lithium deposition, and requiring no SEI (solid electrolyte interface) film on the negative electrode surface, unlike the carbon-based material. In addition, the titanium-containing oxides include, besides most reported spinel-type lithium titanates ($Li_4Ti_5O_{12}$, abbreviation: LTO), monoclinic titanium dioxides ($TiO_2$, abbreviation: $TiO_2$ (B)) and niobium-titanium composite oxides ($Nb_2TiO_7$, abbreviation: NTO), and have, in common, the previously listed features which differ from those of the carbon-based materials listed above, while it is believed that the oxides also have differences derived from differences in crystal and element composition.

The negative electrode including the titanium and niobium containing composite oxide operates at 1.0 V (vs. $Li/Li^+$) or more with respect to the lithium metal potential, thus requiring no SEI film unlike the carbon-based materials, but a thinner surface film is believed to be formed, as compared with the carbon-based materials.

In the battery including the nonaqueous electrolyte containing the phosphate compound, the compound is presumed to have the effect of contributing to stabilization of the electrolyte salt, thereby inhibiting a side reaction at the negative electrode surface, and preventing thick films being produced. As a result, the charge-and-discharge cycle performance is improved.

The phosphate compound is presumed to contribute to stabilization of an anion or anion decomposition product constituting the lithium salt in the nonaqueous electrolyte. For this reason, at least one of $R_1$, $R_2$, and $R_3$ is desirably a phenyl group, thereby making it possible to reduce the irreversible capacity during charge and discharge. This is assumed to be because the change in electron density at a P=O part of the phosphine oxide of the formula (1) further increases stabilization of the anion or anion decomposition product.

On the other hand, at the negative electrode including a carbon-based material or the like, carbonate such as ethylene carbonate is decomposed at 0.8 V (vs. $Li/Li^+$) or less to produce a protective film referred to as an SEI film at the negative electrode surface. In this regard, when the phosphate compound is included in the nonaqueous electrolyte, the phosphate compound is decomposed to generate a film at a potential that is higher than the decomposition potential of ethylene carbonate or the like that forms a normal SEI film, that is, in advance. The film derived from the phosphate compound is presumed to have inadequate SEI properties, thus leading to performance degradation.

The nonaqueous electrolyte, the positive electrode, and the negative electrode will be described below.

(Nonaqueous Electrolyte)

The nonaqueous electrolyte includes the phosphate compound mentioned previously. Examples of the nonaqueous electrolyte include a liquid nonaqueous electrolyte, a gel nonaqueous electrolyte, and a solid electrolyte. The liquid nonaqueous electrolyte further includes an organic solvent and an electrolyte dissolved in the organic solvent. The gel nonaqueous electrolyte is prepared by combining a liquid electrolyte and a polymer material. It is to be noted that the liquid nonaqueous electrolyte is also referred to as a nonaqueous electrolytic solution.

Examples of the phosphate compound include triphenylphosphine oxide, tri-n-octylphosphine oxide, allyldiphenylphosphine oxide, bis(3,5-dimethylphenyl)phosphine oxide, methyl(diphenyl)phosphine oxide, diphenylphosphine oxide, diphenyl(2,4,6-trimethylbenzoyl)phosphine oxide, 2,5-dihydroxyphenyl(diphenyl)phosphine oxide, di(p-tolyl-phosphine oxide, 3-methyl-1-phenyl-2-phosphorene-1-oxide, methoxymethyl(diphenyl)phosphine oxide, phenylbis(2,4,6-trimethylbenzoyl)phosphine oxide, tributylphosphine oxide, tris(4-methylphenyl)phosphine oxide, triethylphosphine oxide, di-t-butylphosphine oxide, (1-aminoethyl)phosphonic acid, (aminomethyl)phosphonic acid, (4-amino-1-hydroxy-1-phosphonobutyl)phosphonic acid monosodium salt trihydrate, 3-bromopropane phosphonic acid, 1,4-butanediphosphonic acid, (2-bromoethyl)phosphonic acid, (4-bromobutyl)phosphonic acid, (4-bromophenyl)phosphonic acid, (2-chloroethyl)phosphonic acid, 3-phenyl-2-propenyl phosphonic acid, decyl phosphonic acid, pamidronate disodium hydrate, etidronate disodium hydrate, clodronate disodium tetrahydrate, tiludronate disodium, dodecyl phosphonic acid, N,N,N',N'-ethylenediaminetetrakis(methylenephosphonic acid), glycine-N,N-bis(methylenephosphonic acid), etidronic acid, (1H, 1H, 2H, 2H-perfluorodecyl)phosphonic acid, hexadecylphosphonic acid, heptylphosphonic acid, 1,6-hexylenediphosphonic acid, hexylphosphonic acid, methylenediphosphonic acid, 4-methoxyphenylphosphonic acid, nitrilotris(methylene phosphonic acid), n-octylphosphonic acid, nonylphosphonic acid, phenylphosphonic acid, phenethylphosphonic acid, 1,5-pentylenediphosphonic acid, 1,4-phenylenediphosphonic acid, 1,3-propanediphosphonic acid, propylphosphonic acid, 3-phosphonopropionic acid, (3-carboxypropyl)phosphonic acid, sodium ibandronate, tetradecylphosphonic acid, undecylphosphonic acid, vinylphosphonic acid, p-xylylenediphosphonic acid, o-xylylenediphosphonic acid, m-xylenediphosphonic acid, 1-hydroxy-2-(1-imidazolyl)ethane-1,1-diphosphonic acid monohydrate, phenylphosphinic acid, [bis(4-methoxyphenyl)phosphinyloxy]carbamic acid tert-butyl, (2-carboxyethyl)phenylphosphinic acid, 9,10-dihydro-9-oxa-10-phosphaphenanthrene 10-oxide, diphenylphosphinic anhydrate, diphenylphosphinic acid, and lithium phenyl(2,4,6-trimethylbenzoyl)phosphinate. One type, or two or more types of the phosphate compound can be used.

Preferred among the phosphate compounds is triphenylphosphine oxide, methyl(diphenyl)phosphine oxide, or tri-n-octylphosphine oxide.

The phosphate compound of the nonaqueous electrolyte preferably has a content of 0.1 weight % to 2 weight %. Adjusting the content to 0.1 weight % or more achieves excellent charge-and-discharge cycle performance. In addition, adjusting the content to 2 weight % or less can suppress a decrease in ion conductivity due to the phosphate compound. A more preferred content range is 0.5 weight % to 1 weight o, and this range can inhibit deposition of the phosphate compound in the electrolytic solution, and achieve an adequate effect over a long period of time.

The nonaqueous electrolyte desirably further contains therein an isocyanato group (a functional group expressed by —N=C=O). This is because doing so contributes to improved charge-and-discharge cycle performance.

Examples of the compound having an isocyanato group (hereinafter, referred to as an isocyanato group-containing compound) can include diisocyanatohexane (abbreviation: DICNH, also known as hexamethylene diisocyanate, 1,6-Isocyanate hexane), isocyanatobutane (1,4-Isocyanate butane), tert-butyl isocyanate ($C_5H_9NO$), butyl isocyanate ($C_5H_9NO$), cyclohexyl isocyanate, cyclopentyl isocyanate, ethyl isocyanate, heptyl isocyanate, hexyl isocyanate (Isobutyl Isothiocyanate), isopropyl isocyanate, 1-naphthyl isocyanate, octadecyl isocyanate, 4-penten-1-yl isothiocyanate, phenyl isocyanate, and propyl isocyanate.

One type, or two or more types of the isocyanato group-containing compound can be used. The isocyanato group-containing compound is presumed to form a film on the negative electrode surface, and is able to stabilize the film over a long period of time through use in combination with the phosphate compound. In terms of film stability, preferred is diisocyanatohexane.

The isocyanato group-containing compound of the nonaqueous electrolyte desirably has a content of 0.1 weight % to 2 weight %. This is presumed to be because a content below this range results in an insufficient covering on the negative electrode surface, thereby leading to failure to achieve sufficient stability. On the other hand, a content greater than this range results in an excessively thick film, thereby adversely affecting input-output characteristics. A more preferred range of the content is 0.5 weight % to 1 weight %.

The nonaqueous electrolyte includes a solvent that is able to dissolve the phosphate compound, the electrolyte, or the like. It is possible to use an organic solvent for the solvent. Examples of the organic solvent include ethylene carbonate (EC), propylene carbonate (PC), dimethylcarbonate (DMC), methylethylcarbonate (MEC), diethylcarbonate (DEC), gamma-butyrolactone (GBL), acetonitrile (AN), ethylacetate (EA), toluene, xylene, or methylacetate (MA). The organic solvent used can comprise one type, or two or more types of solvent.

For example, a lithium salt is for the electrolyte. Examples of the lithium salt include lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate, bistrifluoromethylsulfonylimide lithium ($LiN(CF_3SO_2)_2$; TFSI), and bispentafluoroethylsulfonylimide lithium ($LiN(C_2F_5SO_2)_2$). The lithium salt used can comprise one type, or two or more types of salt. Due to the fact that a more favorable cycle performance can be achieved, $LiPF_6$ and/or $LiBF_4$ are desired, and a mixed salt of $LiPF_6$ and $LiBF_4$ may be adopted.

The concentrate of the electrolyte can fall within the range of 0.5 to 2.5 mol/l.

The respective contents of the phosphate compound and isocyanato group-containing compound in the nonaqueous electrolyte are measured by the following method. A case of using a nonaqueous electrolytic solution as the nonaqueous electrolyte will be described as an example.

First, in accordance with the following method, the battery is disassembled to extract the nonaqueous electrolytic solution.

For the battery, the container member is broken in a booth that has a sufficiently low dew point or an argon glove box, thereby taking out the electrode group that the positive and negative electrodes and separator are integrated. In this case, the nonaqueous electrolytic solution, if any, in the container member is collected. When the nonaqueous electrolytic solution is not able to be collected, or when the amount thereof is insufficient in quantity, the electrolytic solution can be obtained by putting the electrode group in a hermetically sealable centrifuge, and separating the nonaqueous electrolytic solution soaking through the electrodes and the separator with the use of a centrifuge.

Next, the amount of each of the phosphate compound and the isocyanato group-containing organic compound is measured by the following method. Whether the compounds are contained or not can be determined by the presence or absence of a peak at 30 to 50 ppm when the collected electrolytic solution is diluted with a solvent for NMR (nuclear magnetic resonance), such as CDCl3, and subjected to 13P-NMR measurement. Next, the same reference sample is prepared, several types of reference solutions with predetermined amounts of the sample dissolved are subjected to the measurement to create a calibration curve, and the contents can be figured out by comparing the calibration curve with the intensity of the peaks in question.

(Positive Electrode)

The positive electrode contains a positive electrode active material, and can additionally contain a substance that has electron conductivity, such as carbon, and a binder. A positive electrode is used which includes, as a current collector, a substrate such as a metal that has electron conductivity, with a positive electrode active material-containing layer in contact with the current collector.

Chalcogen compounds can be used singly or mixed as the positive electrode active material, such as lithium-containing cobalt composite oxides (e.g., $Li_xCoO_2$ ($0<x\leq1$)), lithium-containing nickel composite oxides (e.g., $Li_xNiO_2$ ($0<x\leq1$)), lithium-containing nickel-cobalt composite oxides (e.g., $Li_xNi_{1-y-z}Co_yMn_zO_2$ ($0<x\leq1$, $0<y\leq1$, $0\leq z\leq1$)), lithium-manganese composite oxides (e.g., $Li_xMn_2O_4$ ($0<x\leq1$), $Li_xMnO_2$ ($0<x\leq1$), $Li_xMn_{2-y}Ni_yO_4$ ($0<x\leq1$, $0<y\leq2$)), lithium-containing nickel-cobalt-manganese composite oxides ($Li_xNi_{1-y-z}Co_yMn_zO_2$ ($0<x\leq1.1$, $0<y\leq0.5$, $0<z\leq0.5$, $0<1-y-z<1$)). Above all, cases of including the lithium-containing cobalt composite oxides, lithium-containing nickel-cobalt composite oxides, lithium-containing manganese composite oxides, and the like which have charge-discharge potentials of 3.8 V (vs. Li/Li$^+$) or more with respect to the potential of lithium metal are desirable, because high battery capacities can be achieved.

Substances that have electron conductivity, such as carbon and metals, can be used as the conductive material. The conductive agent is desirably in a powder or fibrous powder form.

Polytetrafluoroethylene (PTFE), polyvinylidenefluoride (PVdF), ethylene-propylene-diene copolymers, styrene-butadiene rubbers, and the like can be used as the binder.

Metal foil, thin plates or meshes, wire fabrics, or the like including a metal such as aluminum, stainless steel, and titanium can be used as the current collector.

The positive electrode active material and the conductive material can be, with the addition of a binder thereto, made into a sheet by kneading and pressing. Alternatively, it is also possible to dissolve the materials or suspend them in a solvent such as toluene and N-methylpyrrolidone (NMP), which forms a slurry, then apply the slurry onto the current collector, and dry the slurry, thereby making a sheet.

(Negative Electrode)

The negative electrode includes a titanium and niobium-containing composite oxide as a negative electrode active material, and has the form of a pellet, a thin plate, or a sheet obtained by shaping the negative electrode active material with the use of a conductive material, a binder, or the like.

Examples of the titanium and niobium-containing composite oxide include niobium-titanium composite oxides, and orthorhombic sodium-containing niobium-titanium composite oxides. Examples of the niobium-titanium composite oxides include $Nb_2TiO_7$ (abbreviation: NTO), and $Li_aTiM_bNb_{2+\beta}O_{7+\sigma}$ having a monoclinic structure ($0\leq a\leq5$, $0\leq b\leq0.3$, $0\leq\beta\leq0.3$, $0\leq\sigma\leq0.3$, M is at least one or more elements of Fe, V, Mo, and Ta).

Examples of the orthorhombic sodium-containing niobium-titanium composite oxides include $Li_2Na_{2-x}Ti_{6-y}Nb_zO_{14}$ ($0\leq x<2$, $0\leq y<6$, $0<z<2$, abbreviation: LNTN). The niobium-titanium composite oxides and the orthorhombic sodium-containing niobium-titanium composite oxides are each higher in surface reactivity than spinel-type lithium titanate ($Li_4Ti_5O_{12}$; LTO), and thus can be expected to have great effects with a combination of each composite oxides and the nonaqueous electrolyte including the phosphate compound.

Substances that have electron conductivity, such as carbon and metals, can be used as the conductive material. The conductive agent desirably has a form such as a powder or fibrous powder form.

Polytetrafluoroethylene (PTFE), polyvinylidenefluoride (PVdF), styrene-butadiene rubbers, carboxymethyl cellulose (CMC), and the like can be used as the binder.

Metal foil, thin plates or meshes, wire fabrics, or the like including a metal such as aluminum, copper, stainless steel, and nickel can be used as the current collector.

The negative electrode active material and the conductive material can be, with the addition of a binder thereto, made into a pellet or a sheet by kneading and pressing. Alternatively, it is also possible to dissolve the materials or suspend them in a solvent such as water and N-methylpyrrolidone (NMP), to form a slurry, then apply the slurry onto the current collector, and dry the slurry, thereby making a sheet.

For the nonaqueous electrolyte secondary battery, a separator may be disposed between the positive electrode and the negative electrode. In addition, it is also possible to further include a container member in which the electrode group including the positive electrode and the negative electrode is housed.

(Separator)

Examples of the separator include a polyolefin porous film, a cellulose non-woven fabric, a polyethylene terephthalate non-woven fabric, and a polyolefin non-woven fabric. The polyolefin porous film and the polyolefin non-woven fabric are desired, because water and alcoholic impurities can be prevented from incorporating impurities. In addition, the non-woven fabrics are desired, because such fabrics have excellent performance when impregnated with highly viscous sulfone nonaqueous electrolytes. However, the cellulose non-woven fabric has the advantage of low price, but is highly hygroscopic, and likely to take water as an impurity in the battery, and thus, in the case of using the cellulose non-woven fabric, it is desirable to remove water by vacuum drying. Separators with different types of films stacked, and separators provided with a function of short circuit protection or a function of improving impregnation performance by forming a layer of non-conductive substance can be also used.

(Container Member)

Examples of the container member include metallic or resin cans, and container members made from laminate films. prismatic containers made from metals such as aluminum, iron, and stainless steel can be used as the metallic cans. In addition, prismatic containers of plastic, ceramic, or the like can also be used. For example, a laminate film including a metallic layer such as aluminum, copper, or stainless steel, and a resin layer, which is formed into a sac-like shape by thermal fusion bonding, is used for the container member made from the laminate film. Container members made from laminate films can be used, because it is possible to detect changes in battery appearance upon the generation of a gas inside.

It is possible to apply the secondary battery according to the embodiment to secondary batteries in various forms such as prismatic shapes, cylindrical shapes, flattened shapes, thin shapes, and coin shapes. Examples of the nonaqueous electrolyte secondary battery are shown in FIGS. 1 through 4.

The nonaqueous electrolyte secondary battery shown in FIG. L is a flattened nonaqueous electrolyte secondary battery. The nonaqueous electrolyte secondary battery includes: an electrode group where a positive electrode 1 with a positive electrode terminal 5 electrically connected thereto, a negative electrode 2 with a negative electrode terminal 6 electrically connected thereto, and a separator 3 are stacked in a zigzag manner; a nonaqueous electrolyte with which the electrode group is impregnated; and a container member made by sealing a container member material for housing the nonaqueous electrolyte and the electrode group. As shown in FIG. 2, the positive electrode 1 includes a positive electrode active material containing layer 1a on one or both sides of a positive electrode current collector 1b. On the other hand, the negative electrode 2 includes a negative electrode active material containing layer 2a on one or both sides of a negative electrode current collector 2b.

The positive electrode terminal 5 has a metallic ribbon, a metallic plate, or a metallic rod electrically connected to the positive electrode 1. The positive electrode terminal 5 is electrically connected to the positive electrode 1, for working as an electrical connection between outside of the battery and the positive electrode 1. As shown in FIG. 1, the positive electrode current collector 1b may be welded to a metallic ribbon, and the metallic ribbon may be extended outside of the container member, as the positive electrode terminal. For the positive electrode terminal 5, a conductive material can be used, such as aluminum and titanium.

The negative electrode terminal 6 has a metallic ribbon, a metallic plate, or a metallic rod electrically connected to the negative electrode 2. The negative electrode terminal 6 is electrically connected to the negative electrode 2, for working as an electrical connection between outside of the battery and the negative electrode 2. As shown in FIG. 1, the negative electrode current collector 2b may be welded to a metallic ribbon, and the metallic ribbon may be extended outside of the container member, as the negative electrode terminal 6. As the negative electrode terminal 6, a conductive material can be used such as aluminum, copper, and stainless steel. Desired is aluminum and aluminum alloy which are light in weight and excellent in welding connectivity.

While the positive electrode terminal and the negative electrode terminal are extended respectively from one side of the stacked electrode group and the other side thereof in FIGS. 1 and 2, how to extend the positive electrode and negative electrode terminals is not to be considered limited to the foregoing, but for example, a positive electrode terminal and a negative electrode terminal can be also extended from the same end surface of an electrode group rolled into a flattened form. An example thereof is shown in FIGS. 3 and 4.

Figure 4:
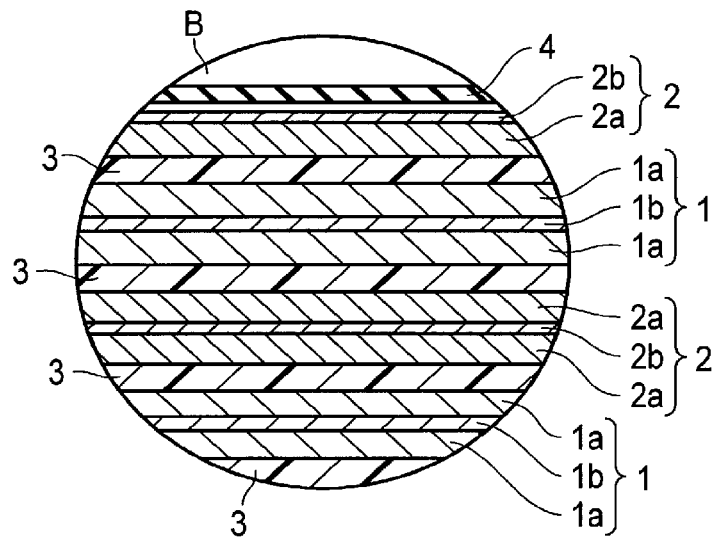
FIG. 4 is an enlarged cross-sectional view of a B part in FIG. 3.

As shown in FIG. 3, a flattened wound electrode group 7 is housed in a sac or bag-like container member 4 of a laminate film with a metallic layer interposed between two resin films. The flattened wound electrode group 7 is formed by spirally winding a stacked body obtained by stacking in the order of a negative electrode 2, a separator 3, a positive electrode 1, and a separator 3 from the outside, and pressing the stacked body into a shape. The negative electrode 2 as an outermost layer is configured to have a negative electrode active material-containing layer 2a formed on one inner side of a negative electrode current collector 2b, as shown in FIG. 4, whereas the another negative electrodes 2 are each configured to have a negative electrode active material-containing layer 2a formed on both sides of a negative electrode current collector 2b. The positive electrode 1 is configured to have a positive electrode active material containing layer 1a formed on both sides of a positive electrode current collector 1b.

Near the an outer peripheral end of the wound electrode group 7, the negative electrode terminal 9 is connected to the negative electrode current collector 2b of the negative electrode 2 as an outermost layer, whereas the positive electrode terminal 8 is connected to the positive electrode current collector 1b of the inner positive electrode 1. The negative electrode terminal 9 and the positive electrode terminal 8 are extended from openings of the sac or bag-like container member 4 to the outside. For example, a liquid nonaqueous electrolyte is injected from the openings of the sac or bag-like container member 4. The openings of the sac or bag-like container member 4 are heat-sealed, thereby hermetically enclosing the rolled electrode group 7 and the liquid nonaqueous electrolyte. When the openings are heat-sealed, the negative electrode terminal 9 and the positive electrode terminal 8 are sandwiched at the openings by the sac or bag-like container member 4.

The form of the electrode group or container member of the nonaqueous electrolyte secondary battery is not to be considered limited to the examples mentioned above, and cylindrical or stacked electrode groups and metallic container members may also be used.

The above-described nonaqueous electrolyte secondary battery according to the first embodiment includes the negative electrode containing the titanium and niobium containing composite oxide, and the nonaqueous electrolyte containing at least one compound selected from the compounds represented by the formulas (1) and (2), thus effectively inhibiting a side reaction in the charge and discharge reactions, and making it possible to improve the cycle performance.

Second Embodiment

A battery pack according to the second embodiment can include as a unit cell one or more nonaqueous electrolyte batteries according to the first embodiment. The nonaqueous electrolyte batteries can be electrically series- or parallel-connected, or combined using series and parallel connections to constitute a battery module. The battery pack according to the second embodiment may include a plural battery modules.

The battery pack according to the second embodiment can further include a protective circuit. The protective circuit has the function of contpressing the charge and discharge for the nonaqueous electrolyte battery. Alternatively, a circuit included in a system that includes the battery pack as a power source (for example, an electronic device, a vehicle such as an automobile) can be used as the protective circuit of the battery pack.

In addition, the battery pack according to the second embodiment can further include an external power distribution terminal. The external power distribution terminal is configured to output a current from the nonaqueous electrolyte battery, and/or input a current to the nonaqueous electrolyte battery. In other words, in using the battery pack as a power source, a current is supplied to the outside through the external power distribution terminal. In addition, in charging the battery pack, a charge (including regenerative energy for powering vehicles such as automobiles) is supplied to the battery pack through the external power distribution terminal.

Such a battery pack will be described in detail with reference to FIGS. 5 and 6. The flattened battery shown in FIG. 3 can be used for unit cells.

A plurality of unit cells 21 configured from the previously mentioned flattened nonaqueous electrolyte battery shown in FIG. 3 is stacked such that a negative electrode terminal 9 and a positive electrode terminal 8 extended to the outside are aligned in the same orientation, and fastened with an adhesive tape 22, thereby constituting a battery module 23. The unit cells 21 are electrically series-connected to each other as shown in FIG. 6.

A printed wiring board 24 is disposed to be opposed to, among side surfaces of the unit cells 21, the side surfaces from which the negative electrode terminal 9 and the positive electrode terminal 8 are extended. On the printed wiring board 24, a thermistor 25, a protective circuit 26, and as the external power distribution terminal an energizing terminal 27 to an external device are mounted as shown in FIG. 6. Further, an insulating plate (not shown) is attached to a surface of the protective circuit 26 opposed to the battery module 23, in order to avoid unnecessary connections to wirings of the battery module 23.

A positive electrode side lead 28 is connected to a positive electrode terminal 8 located on the lowermost layer of the battery module 23, with an end of the lead inserted into a positive electrode side connector 29 of the printed wiring board 24, and electrically connected. A negative electrode side lead 30 is connected to a negative electrode terminal 9 located on the uppermost layer of the battery module 23, with an end of the lead inserted into a negative electrode side connector 31 of the printed wiring board 24, and electrically connected. These connectors 29, 31 are connected to the protective circuit 26 through wirings 32, 33 formed on the printed wiring board 24.

The thermistor 25 detects the temperature of the unit cell 21, and the detected signal is transmitted to the protective circuit 26. The protective circuit 26 can, under a predetermined conduction, break a plus wiring 34a and a minus wiring 34b between the protective circuit 26 and the energizing terminal 27 to an external device. The predetermined conduction refers to, for example, when the temperature detected by the thermistor 25 is equal to or higher than a predetermined temperature. In addition, the predetermined condition refers to when over-charge, over-discharge, over-current, or the like is detected in the unit cells 21. The detection of over-charge or the like is directed to the individual unit cells 21 or all unit cells 21. In the case of detection for the individual unit cells 21, the voltages of the cells may be detected, or the positive electrode potential or the negative electrode potential may be detected. In the latter case, lithium electrodes for use as reference electrodes are inserted into the individual unit cells 21. In the case of FIGS. 5 and 6, a wiring 35 for voltage detection is connected to each of the unit cells 21, and detected signals are transmitted to the protective circuit 26 through the wiring 35.

Protective sheets 36 of a rubber or a resin are disposed respectively on three side surfaces of the battery module 23. Specifically, the protective sheets 36 are disposed on, among the side surfaces of the battery module 23, the three side surfaces other than the side surface from which the positive electrode terminal 8 and the negative electrode terminal 9 are protruded.

The battery module 23 is housed in a housing container 37, along with the respective protective sheets 36 and the printed wiring board 24. More specifically, the protective sheets 36 are disposed respectively on both inner surfaces of a housing container 37 in the longer side direction and one inner surface thereof in the shorter side direction. The printed wiring board 24 is disposed on the inner surface on the side opposite to the protective sheet 36 disposed in the shorter side direction. The battery module 23 is located in the space surrounded by the protective sheets 36 and the printed wiring board 24. A lid 38 is attached to the upper surface of the housing container 37.

It is to be noted that for fixing the battery module 23, a heat-shrinkable tape may be used in place of an adhesive tape 22. In this case, a protective sheet is disposed on both side surfaces of the battery module, the heat-shrinkable tape is wrapped, and the heat-shrinkable tape is then shrunk by heat to bind the battery module.

While FIGS. 5 and 6 show the embodiment with the unit cells 21 series-connected, the cells may be connected in parallel in order to increase the battery capacity. Assembled battery packs can be also connected in series or in parallel.

In addition, the embodiment of the battery pack is appropriately changed depending on the intended use. Applications that require both large-current discharge performance and preferred life performance are preferred as applications of the battery pack. Specific applications include power sources for digital cameras, and in-vehicle batteries for two-wheel to four-wheel hybrid electric automobiles, two-wheel to four-wheel electric automobiles, assisted bicycles and electric trains. In particular, for in-vehicle applications, the battery pack can be used in a preferred manner.

In the vehicle on which the battery pack according to the second embodiment is mounted, the battery pack is configured to recover the regenerative energy of the power of the vehicle, for example. Examples of the vehicle include two to four-wheeled hybrid electric automobiles, two to four-wheeled electric automobiles, electric assist bicycles, and electric trains.

An automobile as an example including a battery pack as an example according to a second embodiment is shown in FIG. 7.

In an automobile 41 shown in FIG. 7, a battery pack 42 as an example according to the second embodiment is mounted in an engine room located in the front part of a vehicle body. The mounting position of the battery pack in the automobile is not limited to the engine room. For example, the battery pack can also be mounted in the rear part of the vehicle body of the automobile or under a seat of the automobile.

According to the second embodiment just described, the battery pack includes one or more nonaqueous electrolyte secondary batteries. The nonaqueous electrolyte secondary batteries of the battery pack are nonaqueous electrolyte secondary batteries according to the first embodiment. The battery pack includes the nonaqueous electrolyte batteries according to the first embodiment, and thus can achieve excellent life performance.

EXAMPLES

Examples will be described in detail below with reference to the figures and a table. The battery structure shown in FIG. 1 is adopted for the following examples.

Example 1

Lithium-containing nickel-cobalt-manganese composite oxide ($LiNi_{1/3}CO_{1/3}Mn_{1/3}O_2$) powder: 90 weight % as a positive electrode active material; acetylene black: 2 weight %; graphite: 3 weight %; and polyvinylidene fluoride: 5 weight % as a binder were made into a slurry with N-methylpyrrolidone as a solvent. The obtained slurry was applied to both sides of aluminum foil of 15 μm thickness, dried, and subjected to pressing to create a positive electrode sheet of 67 mm width and 92 mm length. One end part (5 mm width) of the positive electrode sheet, parallel to the length direction thereof, was regarded as an uncoated part, and an aluminum ribbon of 5 mm width and 0.1 mm thickness was, as a positive electrode tab, welded to the part at three points.

Niobium-titanium composite oxide ($Nb_2TiO_7$) powder: 90 weight % as a negative electrode active material; artificial graphite: 5 weight % as a conductive material; and polyvinylidene fluoride (PVdF): 5 weight % were added to an N-methylpyrrolidone (NMP) solution, and mixed to prepare a slurry. The obtained slurry was applied to both sides of aluminum foil of 25 μm thickness, dried, and then subjected to pressing. The negative electrode sheet obtained was cut into a sheet of 68 mm width and 93 mm length, one end part (5 mm width) of the sheet, parallel to the length direction thereof, was regarded as an uncoated part, and an aluminum ribbon of 5 mm width and 0.1 mm thickness was, as a negative electrode tab, welded to the part at three points.

A polyethylene porous film as a type of polyolefin porous film of 93 mm width was used for a separator.

The strip-shaped positive electrode sheet, the separator, the strip-shaped negative electrode sheet, and the separator were each stacked 10 times in this order, thereby creating an electrode group. An aluminum sheet of 0.1 mm thickness, 30 mm width, and 50 mm length was welded to the positive electrode tab, thereby forming a positive electrode terminal. An aluminum sheet of 0.1 mm thickness, 30 mm width, and 50 mm length was welded to the negative electrode tab, thereby forming a negative electrode terminal.

The electrode group was housed in an container member of an aluminum layer-containing laminate film. As a nonaqueous electrolytic solution, 1 M (mol/l) of $LiPF_6$ was dissolved in an organic solvent of propylene carbonate (PC) and diethyl carbonate (DEC) mixed at a volume ratio of 1:2, and 1 weight % of triphenylphosphine oxide was further dissolved therein. In the container member with the electrode group housed therein, 8 g of the nonaqueous electrolytic solution was injected, and the container member was heat-sealed, and thus closed, thereby providing a nonaqueous electrolyte secondary battery.

Example 2

As a nonaqueous electrolytic solution, 1 M of $LiPF_6$ was dissolved in an organic solvent of propylene carbonate (PC) and diethyl carbonate (DEC) mixed at a volume ratio of 1:2, and 1 weight % of triphenylphosphine oxide and 1 weight % of diisocyanatohexane were further dissolved therein. In the same way as in Example 1 except for the use of the nonaqueous electrolytic solution, a nonaqueous electrolyte secondary battery was prepared.

Example 3

As a nonaqueous electrolytic solution, 1 M of $LiPF_6$ was dissolved in an organic solvent of propylene carbonate (PC) and diethyl carbonate (DEC) mixed at a volume ratio of 1:2, and 1 weight % of methyldiphenylphosphine oxide was further dissolved therein. In the same way as in Example 1 except for the use of the nonaqueous electrolytic solution, a nonaqueous electrolyte secondary battery was prepared.

Example 4

As a nonaqueous electrolytic solution, 1 M of $LiPF_6$ was dissolved in an organic solvent of propylene carbonate (PC) and diethyl carbonate (DEC) mixed at a volume ratio of 1:2, and 1 weight % of tri-n-octylphosphine oxide was further dissolved therein. In the same way as in Example 1 except for the use of the nonaqueous electrolytic solution, a nonaqueous electrolyte secondary battery was prepared.

Example 5

As a nonaqueous electrolytic solution, 1 M of $LiPF_6$ was dissolved in an organic solvent of propylene carbonate (PC) and diethyl carbonate (DEC) mixed at a volume ratio of 1:2, and 1 weight % of tri-n-octylphosphine oxide and 1 weight % of diisocyanatohexane were further dissolved therein. In the same way as in Example 1 except for the use of the nonaqueous electrolytic solution, a nonaqueous electrolyte secondary battery was prepared.

Example 6

Orthorhombic sodium-containing niobium-titanium composite oxide ($Li_2Na_{1.8}Ti_{5.8}Nb_{0.2}O_{14}$) powder: 85 weight % as a negative electrode active material; artificial graphite: 5 weight % and acetylene black: 4 weight % as a conductive material; and polyvinylidene fluoride (PVdF): 6 weight % were added to an N-methylpyrrolidone (NMP) solution, and mixed to prepare a slurry. The obtained slurry was applied to both sides of aluminum foil of 25 μm in thickness, dried, and then subjected to pressing. In the same way as in Example 1 except for the use of the nonaqueous electrolytic solution, a nonaqueous electrolyte secondary battery was prepared.

Example 7

As a nonaqueous electrolytic solution, 1 M of $LiPF_6$ was dissolved in an organic solvent of propylene carbonate (PC) and diethyl carbonate (DEC) mixed at a volume ratio of 1:2, and 1 weight % of triphenylphosphine oxide and 1 weight % of diisocyanatohexane were further dissolved therein. In the same way as in Example 6 except for the use of the nonaqueous electrolytic solution, a nonaqueous electrolyte secondary battery was prepared.

Comparative Example 1

As a nonaqueous electrolytic solution, 1 M of $LiPF_6$ was dissolved in an organic solvent of propylene carbonate (PC) and diethyl carbonate (DEC) mixed at a volume ratio of 1:2. In the same way as in Example 1 except for the use of the nonaqueous electrolytic solution, a nonaqueous electrolyte secondary battery was prepared.

Comparative Example 2

As a nonaqueous electrolytic solution, 1 M of $LiPF_6$ was dissolved in an organic solvent of propylene carbonate (PC) and diethyl carbonate (DEC) mixed at a volume ratio of 1:2, and 1 weight % of diisocyanatohexane was further dissolved therein. In the same way as in Example 1 except for the use of the nonaqueous electrolytic solution, a nonaqueous electrolyte secondary battery was prepared.

Comparative Example 3

Spinel-type lithium titanate ($Li_4Ti_5O_{12}$) powder: 90 weight % as a negative electrode active material; artificial graphite: 5 weight % as a conductive material; and polyvinylidene fluoride (PVdF): 5 weight % were added to an N-methylpyrrolidone (NMP) solution, and mixed to prepare a slurry. The obtained slurry was applied to both sides of aluminum foil of 25 μm thickness, dried, and then subjected to pressing. As a nonaqueous electrolytic solution, 1 M of $LiPF_6$ was dissolved in propylene carbonate (PC) and diethyl carbonate (DEC) mixed at a volume ratio of 1:2. In the same way as in Example 1 except for the use of the negative electrode and the nonaqueous electrolytic solution, a nonaqueous electrolyte secondary battery was prepared.

Comparative Example 4

As a nonaqueous electrolytic solution, 1 M of $LiPF_6$ was dissolved in an organic solvent of propylene carbonate (PC) and diethyl carbonate (DEC) mixed at a volume ratio of 1:2, and 1 weight % of triphenylphosphine oxide was further dissolved therein. In the same way as in Comparative Example 3 except for the use of the nonaqueous electrolytic solution, a nonaqueous electrolyte secondary battery was prepared.

Comparative Example 5

As a nonaqueous electrolytic solution, 1 M of $LiPF_6$ was dissolved in an organic solvent of propylene carbonate (PC) and diethyl carbonate (DEC) mixed at a volume ratio of 1:2. In the same way as in Example 6 except for the use of the nonaqueous electrolytic solution, a nonaqueous electrolyte secondary battery was prepared.

The obtained secondary batteries were subjected to a charge-and-discharge cycle test. For Examples 1 to 5 and Comparative Examples 1 to 2, constant-current and constant-voltage charge for 10 hours with 0.2 CA current was carried out as an initial charge at a charge maximum voltage of 2.9 V and a discharge cutoff voltage of 1.5 V. Subsequently, discharge was carried out with 0.2 CA current. Thereafter, a charge-and-discharge cycle of constant-current and constant-voltage charge at 2.8 V with 1CA current to a current cutoff at 0.05 C and discharge to 1.5 V with 1 CA current was repeated 100 times. The test was carried out at an atmospheric temperature of 25° C.

For Examples 6 and 7 and Comparative Example 5, a charge-and-discharge cycle test was carried out under the same conditions as mentioned previously, except that the charge maximum voltage was adjusted to 3.2 V. In addition, for Comparative Examples 3 and 4, a charge-and-discharge cycle test was carried out under the same conditions as mentioned previously, except that the charge maximum voltage was adjusted to 2.8 V.

The discharge capacity retention ratios at the point of 100 cycles for Examples 1 to 7 and Comparative Examples 1 to 5 obtained were calculated on the basis of the discharge capacity in the first cycle, and the results there of are shown in Table 1 below.

TABLE 1

|  | Cycle Maintenance Ratio in 100 Cycles (%) |
| --- | --- |
| Example 1 | 90.5 |
| Example 2 | 93.4 |
| Example 3 | 90.3 |
| Example 4 | 91.1 |
| Example 5 | 93.2 |
| Example 6 | 69.7 |
| Example 7 | 71.2 |
| Comparative Example 1 | 87.6 |
| Comparative Example 2 | 88.5 |
| Comparative Example 3 | 96.8 |
| Comparative Example 4 | 96.5 |
| Comparative Example 5 | 63.4 |

When Examples 1 to 5 are compared with Comparative Examples 1 to 2, where the niobium-titanium composite oxide was used for the negative electrode active material, it is determined that the cycle performance has been improved by adding, as a phosphate compound, triphenylphosphine oxide, methyldiphenylphosphine oxide, or tri-n-octylphosphine oxide. Furthermore, when Example 1 is compared with Example 2, it is determined that the performance has been further improved by adding diisocyanatohexane as a compound having an isocyanato group in addition to the triphenylphosphine oxide.

In Examples 6 to 7 and Comparative Example 5 where the orthorhombic sodium-containing niobium-titanium composite oxide was used for the negative electrode active material, it is determined as well that the cycle performance has been improved by adding, as a phosphate compound, triphenylphosphine oxide.

In the case of Comparative Examples 3 to 4 where the spinel-type lithium titanate was used for the negative electrode active material, Comparative Example 3 without any phosphate compound added has a capacity retention ratio of 96.8%, whereas Comparative Example 4 with the phosphate compound added has a capacity retention ratio of 96.5%, and it is determined that the comparative examples have failed to achieve the effect of the phosphate compound.

From the foregoing results, it has been determined that the cycle performance of the nonaqueous electrolyte secondary batteries is improved by adding the phosphine oxides.

The nonaqueous electrolyte secondary battery according to at least one embodiment or example of the foregoing includes: a negative electrode containing a titanium and niobium-containing composite oxide; and a nonaqueous electrolyte containing at least one compound selected from the compounds represented by the formulas (1) and (2), thus allowing the cycle performance to be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery comprising:
a positive electrode;
a negative electrode comprising a titanium and niobium-containing composite oxide; and
a nonaqueous electrolyte comprising at least one compound selected from compounds represented by the following formulas (1) and (2),

formula (1)

wherein
$R_1$, $R_2$, and $R_3$ may be identical to or different from each other, and are each an alkyl group, an alkyl group having, as a part of a structure, an unsaturated bond, amine, or halogen, an aromatic group, halogen, or a hydroxy group and

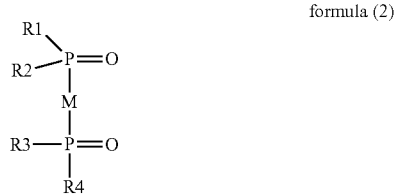

formula (2)

wherein
$R_1$, $R_2$, $R_3$, and $R_4$ may be identical to or different from each other, and are each an alkyl group, an alkyl group having, as a part of a structure, an unsaturated bond, amine, or halogen, an aromatic group, halogen, or a hydroxy group, and M is an alkyl chain, an aromatic site, or an ether bond, and
wherein
the titanium and niobium-containing composite oxide comprises at least one of a niobium-titanium composite oxide and an orthorhombic sodium-containing niobium-titanium composite oxide, the niobium-titanium composite oxide comprising at least one of $Nb_2TiO_7$ and $Li_aTiM_bNb_{2+\beta}O_{7\pm\sigma}$ where $0 \leq a \leq 5$, $0 \leq b \leq 0.3$, $0 \leq \beta \leq 0.3$, $0 \leq \sigma \leq 0.3$, and M is at least one or more elements of Fe, V, Mo, and Ta, and the orthorhombic sodium-containing niobium-titanium composite oxide comprising $Li_2Na_{2-x}Ti_{6-y}Nb_zO_{14}$ where $0 \leq x<2$, $0 \leq y<6$, and $0<z<2$.

2. The nonaqueous electrolyte battery according to claim 1, wherein the nonaqueous electrolyte further comprises a compound having an isocyanato group.

3. The nonaqueous electrolyte battery according to claim 2, wherein a content of the compound having the isocyanato group in the nonaqueous electrolyte falls within a range of from 0.1 weight % to 2 weight %.

4. The nonaqueous electrolyte battery according to claim 3, wherein the compound having the isocyanato group comprises diisocyanatohexane.

5. The nonaqueous electrolyte battery according to claim 1, wherein a content of the at least one compound selected from the compound represented by formula (1) and formula (2) in the nonaqueous electrolyte falls within a range of from 0.1 weight % to 2 weight %.

6. The nonaqueous electrolyte battery according to claim 1, wherein at least one of R1, R2, and R3 is a phenyl group in the formula (1).

7. The nonaqueous electrolyte battery according to claim 1, wherein the at least one compound selected from the compound represented by formula (1) and formula (2) comprises at least one selected from the group consisting of triphenylphosphine oxide, methyl(diphenyl)phosphine oxide and tri-n-octylphosphine oxide.

8. The nonaqueous electrolyte battery according to claim 1, wherein the $R_1$, $R_2$, and $R_3$ are each independently the alkyl group or the aromatic group in the formula (1), and the $R_1$, $R_2$, $R_3$, and $R_4$ are each independently the alkyl group or the aromatic group in the formula (2).

9. The nonaqueous electrolyte battery according to claim 1, wherein the nonaqueous electrolyte further comprises a solvent, and the solvent is at least one selected from the group consisting of ethylene carbonate, propylene carbonate, dimethylcarbonate, methylethylcarbonate, and diethylcarbonate.

10. The nonaqueous electrolyte battery according to claim 1, wherein the negative electrode comprises a negative electrode active material, a conductive material, and a binder, and the negative electrode active material consists of the titanium and niobium-containing composite oxide.

11. The nonaqueous electrolyte battery according to claim 1, wherein the negative electrode further comprises a conductive material comprising carbon having a form of a powder or fibrous powder.

12. The nonaqueous electrolyte battery according to claim 1, wherein the negative electrode operates at 1.0 V (vs. Li/Li$^+$) or more with respect to a lithium metal potential.

13. A battery pack comprising the nonaqueous electrolyte battery according to claim 1.

14. The battery pack according to claim 13, further comprising an external power distribution terminal and a protective circuit.

15. The battery pack comprising nonaqueous electrolyte batteries, each according to claim 13, and wherein the nonaqueous electrolyte batteries are electrically connected in series, in parallel, or in series in combination with in parallel.

16. A vehicle comprising the battery pack according to claim 13.

17. The vehicle according to claim 16, wherein the battery pack is configured to recover a regenerative energy of a power of the vehicle.

* * * * *